United States Patent [19]

Hall et al.

[11] Patent Number: 5,509,060
[45] Date of Patent: Apr. 16, 1996

[54] NETWORK-ACCESSIBLE INTELLIGENT TELEPHONE SERVICE

[75] Inventors: Steven A. Hall, Berkeley Heights; Beverly M. Jones, Edison, both of N.J.; Orlando S. King, Pembroke Pines, Fla.; Hilary L. Kung, Middletown; Deborah A. Pye, Red Bank, both of N.J.

[73] Assignee: AT&T Corp., Murray Hill, N.J.

[21] Appl. No.: 155,614

[22] Filed: Nov. 19, 1993

[51] Int. Cl.$^6$ .................... H04M 3/42; H04M 17/00
[52] U.S. Cl. .................. 379/207; 379/67; 379/88; 379/201
[58] Field of Search ............... 379/207, 67, 88, 379/89, 201, 142

[56] References Cited

U.S. PATENT DOCUMENTS

| | | | |
|---|---|---|---|
| 4,054,756 | 10/1977 | Comella et al. | 379/207 |
| 4,797,910 | 1/1989 | Daudelin | 379/67 |
| 4,827,500 | 5/1989 | Binkerd et al. | 379/207 |
| 4,866,755 | 9/1989 | Hashimoto | 379/80 |
| 4,922,519 | 5/1990 | Daudelin | 379/67 |
| 4,935,956 | 6/1990 | Hellwarth et al. | 379/112 |
| 4,958,366 | 9/1990 | Hashimoto | 379/74 |
| 4,959,855 | 9/1990 | Daudelin | 379/213 |
| 5,163,083 | 11/1992 | Dowden et al. | 379/88 |
| 5,164,981 | 11/1992 | Mitchell et al. | 379/218 |
| 5,179,585 | 1/1993 | MacMillian et al. | 379/88 |
| 5,185,237 | 1/1993 | Dowden et al. | 379/88 |
| 5,185,781 | 2/1993 | Dowden et al. | 379/67 |

*Primary Examiner*—Jeffery Hofsass
*Assistant Examiner*—Thomas F. Presson
*Attorney, Agent, or Firm*—Robert P. Marley

[57] ABSTRACT

The invention provides a telephone caller with ready access, regardless of his or her location, to an array of calling features and services through an automated interface. The invention provides a caller with these features and services by accessing a central database via a regional processing node. In this manner, a caller may access the same personalized telephone services from anywhere in the world without having to be aware of, or conform to, particular protocols or access procedures required within any given local telephone network. The invention also serves to prompt the caller in the caller's language-of-choice, and accepts commands via standard dual-tone multi-frequency ("DTMF") signals and/or verbally in the caller's language-of-choice.

6 Claims, 4 Drawing Sheets

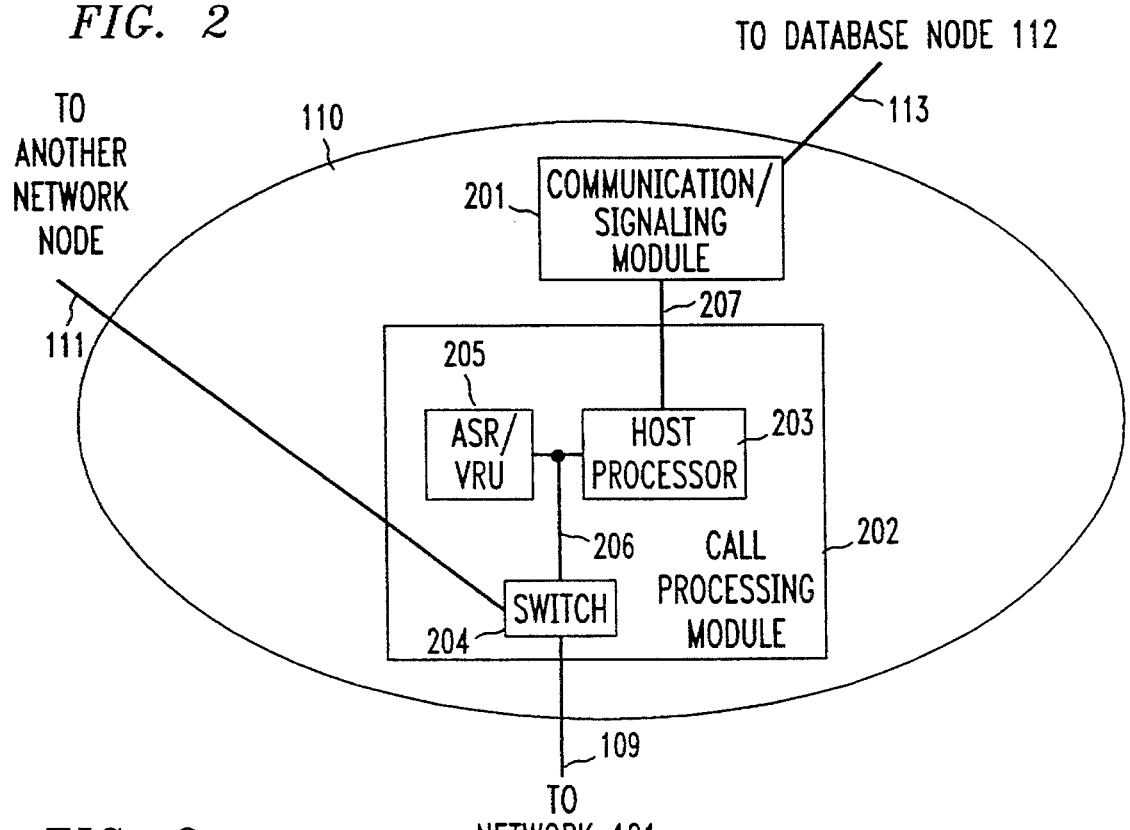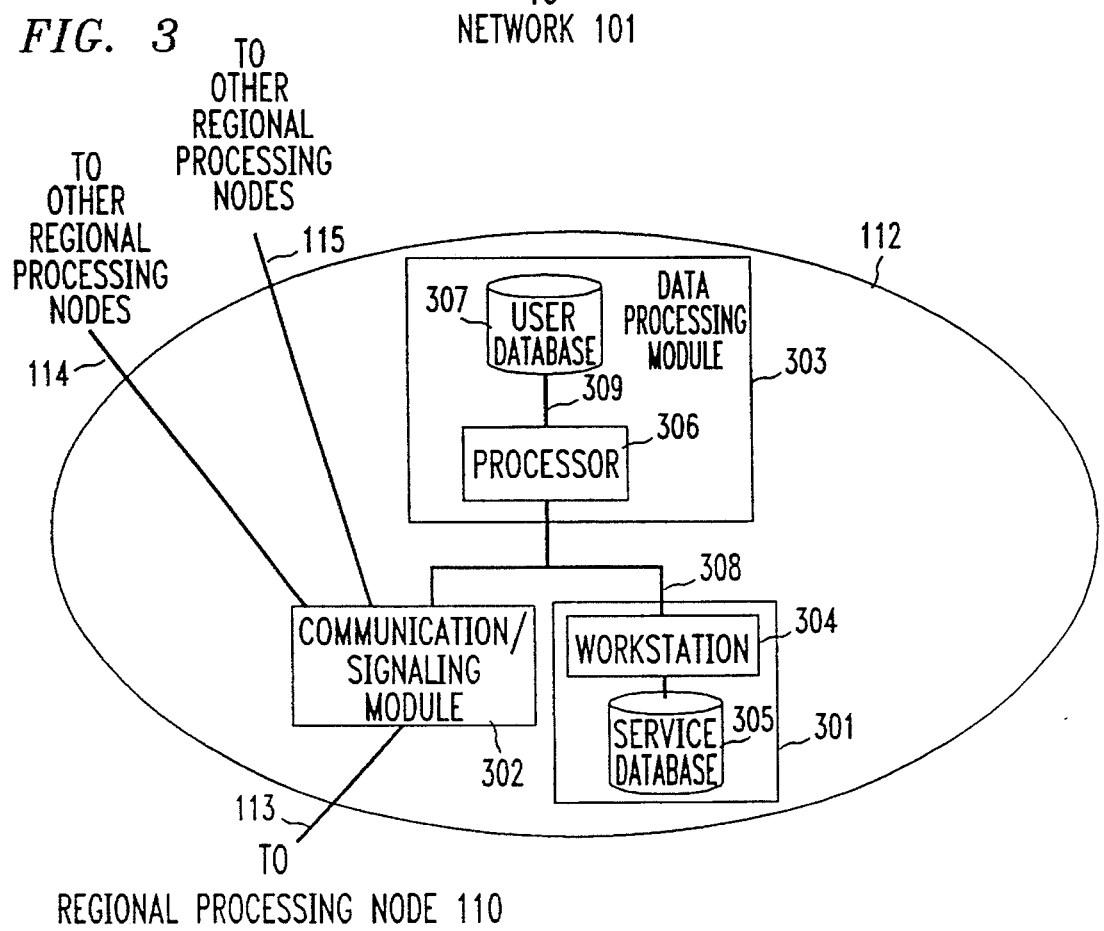

NETWORK-ACCESSIBLE INTELLIGENT TELEPHONE SERVICE

TECHNICAL FIELD

The invention relates to caller-accessible telephone services and, more particularly, to providing such services through an automated, intelligent platform linked to a telephone network.

BACKGROUND OF THE INVENTION

Within modem telephone networks, various automated caller-accessible services have long been available. These have included services facilitating the automated placing of credit and collect calls, services allowing a caller to place a three-party conference call, as well as caller-specific speed dialing services. Such automated services are heavily relied upon by business travelers who often find it essential to quickly place calls from locations outside of their home or office. As almost all businesses have become increasingly globalized, easy access to such automated services from within more than one country or region has become a necessity for more and more business travelers.

While automated caller-accessible services have been offered by various telephone service providers worldwide, many of these services fail to address non-native users in a language which they can readily understand, fail to accept instructions from such users in a language which they speak, fail to provide a consistent means by which the services can be accessed from one country to another, and/or fail to provide access to the same array of services from one country to another. This has left the international business traveler without a simple, consistent and reliable means of accessing needed telecommunication services regardless of the particular country which that traveler happens to be telephoning to or from.

SUMMARY OF THE INVENTION

A method embodying the principles of the invention provides a telephone caller ready access, regardless of his or her location, to an array of calling features and services through an automated interface. The invention provides a caller with these features and services by accessing a central database via a regional processing node. In this manner, a caller may access the same personalized telephone services from anywhere in the world without having to be aware of, or conform to, particular protocols or access procedures required within any given local telephone network. The invention also serves to prompt the caller in the caller's language-of-choice, and accepts commands via standard dual-tone multi-frequency ("DTMF") signals and/or verbally in the caller's language-of-choice.

BRIEF DESCRIPTION OF THE DRAWING

In the drawing:

FIG. 2 shows, in simplified block diagram form, the internal architecture of the call processing node of FIG. 1;

FIG. 3 shows, in simplified block diagram form, the internal architecture of the database processing node of FIG. 1;

DETAILED DESCRIPTION OF THE INVENTION

Figure 1:
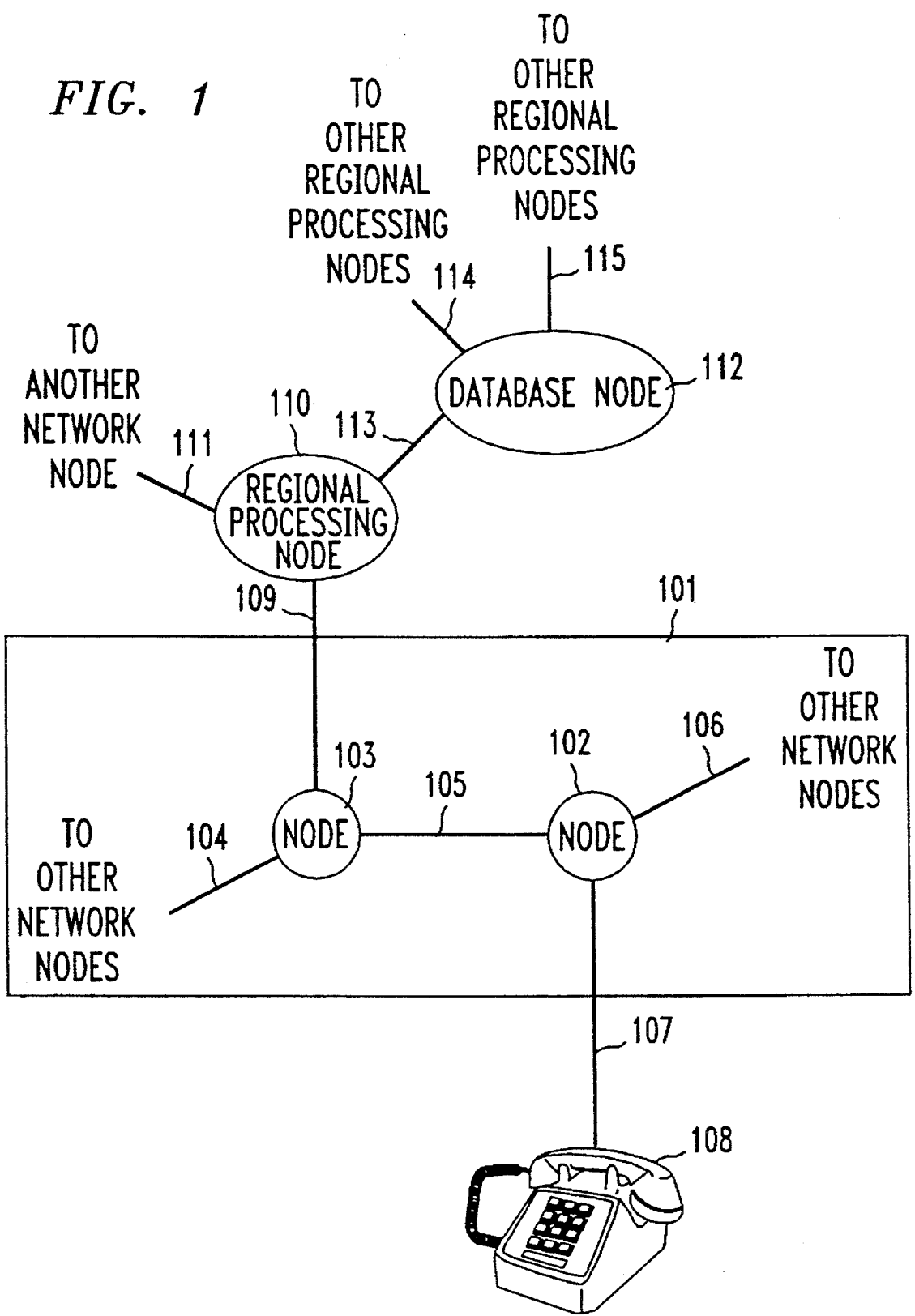
FIG. 1 shows, in simplified block diagram form, a telecommunication system which facilitates the practice of the invention.

FIG. 1 shows, in simplified form, a telecommunication system which facilitates the practice of a particular method of the invention. Specifically shown is public telecommunication network 101, which is depicted as a network having nodes 102 and 103. Each of the nodes includes a switching mechanism that may be selectively connected to other network nodes via public network interconnects 104, 105 and 106. Nodes 102 and 103, in conjunction with the network interconnects, are adapted to provide switched telephonic voice-channel communications between network users that gain access to the network via local interconnects. As shown, node 102 may also be switchably connected, via local interconnect 107, to telephone 108; and node 103 may be switchably connected, via local interconnect 109, to regional processing node 110. In practice, the functionality of node 102 and/or node 103 could be provided by a commercially available program-controlled electronic switching system. Local interconnect 111 serves to link regional processing node 110 with a network node (not illustrated) which need not be contained within public telecommunication network 101. Also shown in FIG. 1 is data base node 112, which is connected to regional processing node 110 by communications/signaling link 113. Communication/signaling links 114 and 115 connect data base node 112 to other regional processing nodes which are not illustrated.

As shown in FIG. 2, regional processing node 110 is comprised of communication/signaling module 201, and call processing module 202. Communication/signaling module 201 provides for communication between regional processing node 110 and data base node 112. This communication is facilitated via Signaling System 7 ("SS7") and Transaction Control Applications Part 1 CTCAP-1") connections established via communications/signaling link 113, which is outside of public telecommunication network 101. Both SS7 and TCAP-1 are well-established telecommunication protocols. Having communications/signaling link 113 separate from public telephone network 101 allows communications between data base node 112 and various regional processing nodes to be performed independent of any network bandwidth limitations or traffic problems. Call processing module 202 includes host processor 203, switch 204, and automatic speech recognition/voice response unit CASR/VRU") 205, all of which are linked via local area network 206. Local area network 206 provides a digital signal path among host processor 203, switch 204, and ASR/VRU 205; and a voice-channel path between switch 204, and ASR/VRU 205. In this particular example, host processor 203 is a personal computer having an 80486 microprocessor, switch 204 is a controllable private branch exchange ("PBX") switch (such as the Definity® Generic 3 PBX manufactured by AT&T), and ASR/VRU 205 is a personal computer having an 80486 microprocessor, a DTMF decoding circuit, and a voice processing circuit board (such as the DT-121 voice processing T-1 interface board manufactured by Dialogic Corporation, Parsippany, N.J.). Host processor 203 is linked to communication/signaling module 201 via digital path 207.

The internal architecture of data base node 112 is shown in FIG. 3. Data base node 112 is comprised of service management module 301, communication/signaling module 302, and data processing module 303. Service management module 301, which performs overall system management and billing functions, includes computer workstation 304 and service database 305. Service database 305 provides service management module 301 with information regarding the configuration of the various networks and regional processing nodes linked to data base node 112, and to provide storage for user billing information received from regional processing nodes. The functionality of service management module 301 can be implemented by the Sparc workstation, manufactured by SUN Microsystems, Milpitas, Calif. Communication/signaling module 302 provides for SS7 communications between data base node 112 and various regional processing nodes (including regional processing node 110). Data processing module 303 includes processor 306 (an 80486 microprocessor based personal computer) and user database 307. User database 307 contains stored information and instructions relating to caller services available through the various regional processing nodes linked to data base node 112. This stored information includes a listing of valid user identifiers, language-of-choice information for system users, as well as a profile of the specific services which should be made available to a particular valid user upon accessing a regional processing node. Processor 306 is linked to service management module 301 and communication/signaling module 302 via local area network 308, and to user database 307 via digital path 309.

In practicing the invention, a caller contacts regional processing node 110 by effecting a telephone call to a language-specific number associated with regional processing node 110. For example, a caller who prefers to speak English would access regional processing node 110 via a number associated with English language services, and a caller who prefers to speak Spanish would access the regional processing node 110 via a different number associated with Spanish language services. All of these numbers should ideally be a toll-free numbers to maximize caller convenience. In this example, the call is initiated from telephone 108 by a caller who has entered a number associated with English language services. The call is completed via a voice channel connection path consisting of local interconnect 107, node 102, public network interconnect 105, node 103, and local interconnect 109.

Upon completion of this call connection, host processor 203 (FIG. 2) identifies the number which the caller entered. This identification may be performed as a function of the particular connection port within the regional processing node which the caller reached (the regional processing node being configured so that each port capable of providing a connection to telecommunication network 101 is dedicated to a particular telephone number), or via an automatic number identification service (if such is available through telecommunication network 101). Host processor 203 then retrieves language information associated with the identified number from a listing within user database 307 (this retrieval is accomplished via communications/signaling link 113, and communication/signaling modules 201 and 302). Host processor 203 then transmits a signal to ASR/VRU 205 indicating the caller's language-of-choice. In response, ASRNRU 205 generates a voice message, in the caller's language-of-choice, which transmitted to the caller via switch 204 and the established voice channel connection path. This message informs the caller that contact with regional processing node 110 has been established, and prompts the caller to provide a personal identifier.

In response to this prompt, the caller would provide a personal identifier which could be a specific series of DTMF signals entered via telephone 108, or a password (consisting of numbers, words, or a combination of both) spoken into telephone 108. If the caller responds to the prompt with DTMF signals, ASR/VRU 205 decodes the response and provides host processor 203 with a digital representation of the personal identifier. If the caller gives a spoken response, ASR/VRU 205 recognizes the response and provides host processor 203 with a digital representation of the personal identifier.

Host processor 203 forwards the received digital representation of the personal identifier to data base node 112 (FIGS. 1 and 3) via communication/signaling module 201 and communications/signaling link 113. Within data base node 112, processor 306 receives the personal identifier from communication/signaling module 302. Processor 306 then compares the received identifier with the valid user identifier listing stored within user database 307. If the received identifier does not match a valid user identifier, processor 306 transmits an "invalid user" signal to host processor 203 (FIG. 2). In response to this invalid user signal, host processor 203 instructs switch 204 to terminate the connection to telephone 108. Prior to termination, host processor 203 may instruct ASRNRU 205 to transmit a voice message informing the caller that the received personal identifier was found to be invalid. Within user database 307, any personal identifier may be designated as invalid for access to certain services by the provider of that service. This may done when a user is simply not subscribed to the particular service being accessed, or if the user is delinquent in payment to the service provider for a particular service. Naturally, a caller may be deemed an invalid user simply because of an error in providing the correct password.

However, if the personal identifier matches a valid user identifier, processor 306 retrieves the profile associated with the user identifier from user database 307, and forwards a record of the callers's identity to service management module 301 for billing purposes. This profile (which contains information as to the particular services which should be made available to the caller, and various user specific information required to execute the services) is transmitted to host processor 203 (FIG. 2). The particular profile may be customized by a user, or simply provide a fixed level of service to which the user has subscribed. Host processor 203 then executes the profile instructions, and configures the components within call processing module 202 to provide the services specified. This includes instructing ASR/VRU 205 to provide the caller (now identified as a valid user) with a voice greeting confirming the caller's identity, and a voice menu of the primary options available through regional processing node 110.

A typical primary menu would include user selectable calling options relating to:

1. Standard telephone services (local, national, or international);
 2. Teleconferencing;
 3. Messaging services;
 4. Directory assistance;
 5. Language services; and
 6. User account information/administration.

The user selects an option from this menu by speaking the name of the desired service into telephone 108, or by entering the appropriate DTMF tone via telephone 108. For example, to select option 1 the user would recite "standard telephone services," or depress the "1" button of a DTMF telephone to generate a tone. If the user responds verbally, the ASR/NRU recognizes the response and provides host processor 203 with a digital representation of the user's choice. If the user responds with a DTMF tone, ASR/NRU 205 decodes the response and provides the appropriate digital signal to host processor 203. If after a predetermined period, $T_m$, the user has failed to provide an appropriate response, host processor 203 instructs switch 205 to terminate the connection to telephone 108. This automatic disconnection serves to free system resources if a user fails to respond to a prompt.

Figure 4:
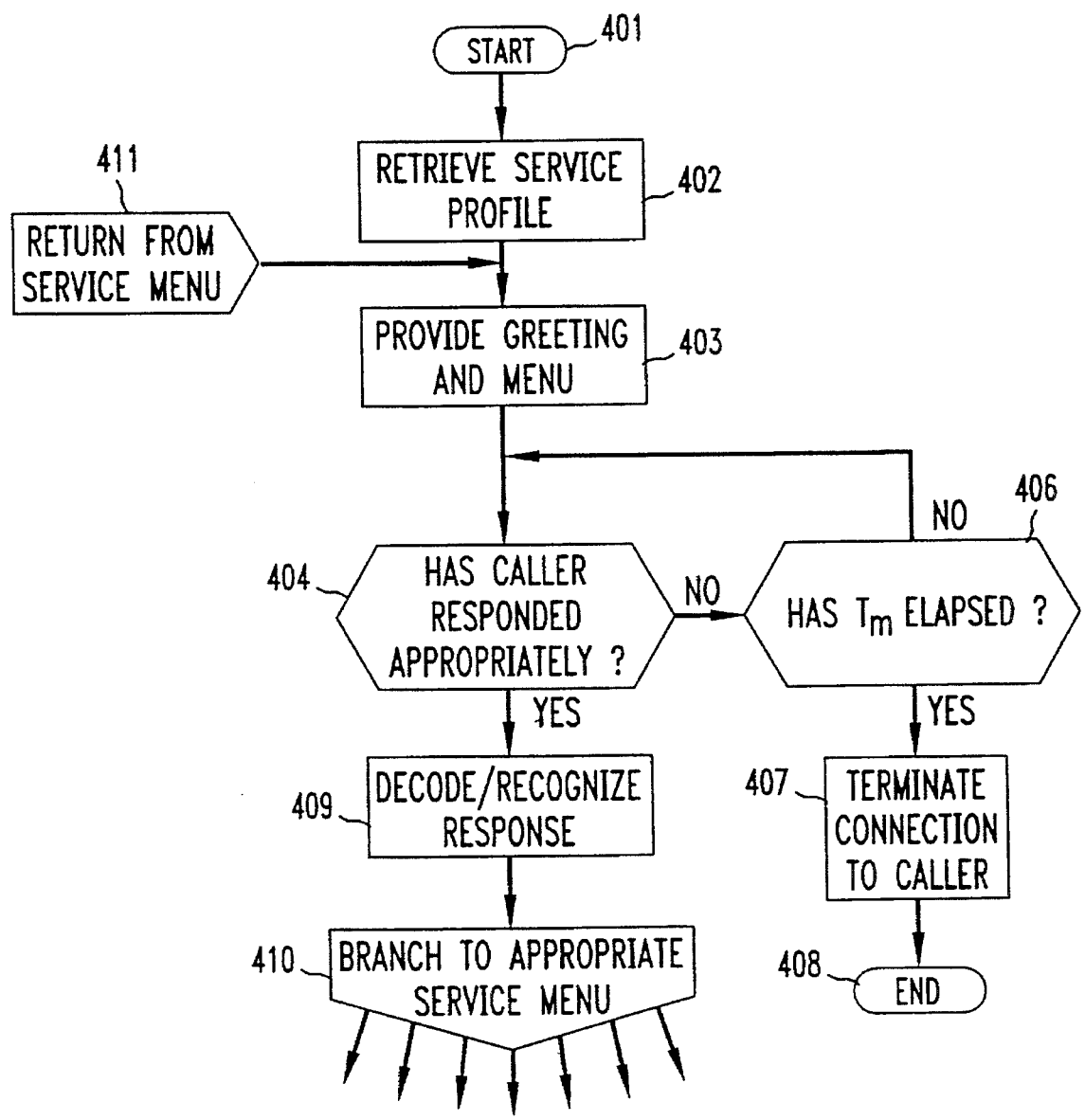
FIG. 4 is a flow diagram of the operations effected within the telecommunication system of FIG. 1 in providing a user with primary menu selection capabilities.

FIG. 4 is a flow diagram illustrating the sequence of operations effected within the telecommunication system of FIG. 1 in providing a user with primary menu selection capabilities. Accordingly, the sequence is entered into via step 401 after validation of the user's personal identifier. Thereafter, the profile for the user is retrieved in operational block 402. Operational block 403 then provides a voice greeting and menu to the user. Conditional branch point 404 tests to determine if the user has provided an appropriate response to menu. If the test result in step 404 is NO, conditional branch point 406 tests to determine if the period $T_m$ has elapsed since the menu was provided to the user. If the test result in step 406 is YES, the connection to the user is terminated in operational block 407, and the call ends in step 408. If the result in step 406 is NO, the operation continues with conditional branch point 404. If the test result in step 404 is YES, speech recognition or DTMF decoding of the response is performed in operational block 409, and the process branches to the appropriate service menu in operational connector 410. Operational connector 411 provides a user with re-entry to the primary menu upon exit from a service menu. Once the system has branched to a particular service menu, the user is provided with a voice menu of options and instructions for the selected service.

As a result of a user selecting the standard telephone services option from the primary menu, host processor 203 (FIG. 2) transmits a digital signal indicative of such to data base node 112 (FIG. 3). Within data base node 112, communication/signaling module 302 receives the signal and passes it to processor 306. Processor 306 retrieves user profile information specific to this option from user database 307. For the standard calling option this information includes a listing of names that was stored as part of the user's profile, wherein each name represents a frequently called party, and is associated with a telephone number that is also stored in user database 307. Processor 306 transmits this information (including the names and numbers) to regional processing node 110 and host processor 203 (FIG. 2).

Host processor 203 then provides ASRNRU 205 with a digital representation of the list of names received from processor 306. In response to receiving this digital representation, ASR/VRU 205 transmits a voice prompt (in the user's language-of-choice) listing the names included in the frequently called party list, and requesting that the user identify the party being called. The user may respond to this prompt by speaking the name of a listed party; by speaking the telephone number to be called; by entering, via a DTMF telephone, the listing number associated with a party (entering "2" would indicate the user wished to be connected to the second listed party); by speaking the telephone number to be called; or by entering the telephone number to be called via a DTMF telephone. If the user responds verbally, the ASR/NRU recognizes the speech and provides host processor 203 with a digital representation of the user's response. If the user responds by entering a number via DTMF signals, ASR/VRU 205 decodes the response and provides the appropriate digital signal to host processor 203.

In the case of a DTMF response, if the DTMF signals are found to be a telephone number by host processor 203, a connection between the user and that number is effected via switch 204. However if host processor 203 determines that the user's DTMF response is representative of a listed frequently called party, a connection is effected between the user and the telephone number associated with that party via switch 204.

A similar processing is performed for verbal responses. If the user responded with a spoken telephone number, a digital representation of that number is forwarded to host processor 203 and a connection to that number is effected via switch 204. If user's response was recognized as one of the names included in the user's frequently called party list, a connection is effected to the telephone number associated with that name. If the user's response is not recognized as a listed name or a proper telephone number, host processor 203 returns the user to the primary menu.

In all of the above connection scenarios, the user need not be acquainted with the particular method a caller within public telecommunication network 101 would usually have to employ in effecting a call. All connection functions, including providing all access codes and/or protocols required within network 101, are handled by host processor 203 and the other components of regional processing node 110 and data base node 112 (all the necessary information to provide such functions being stored in data base node 112 or preprogrammed into host processor 203). The user of the system is always presented with a consistent calling environment regardless of the particular network he or she has accessed a regional processing node from.

Figure 5:
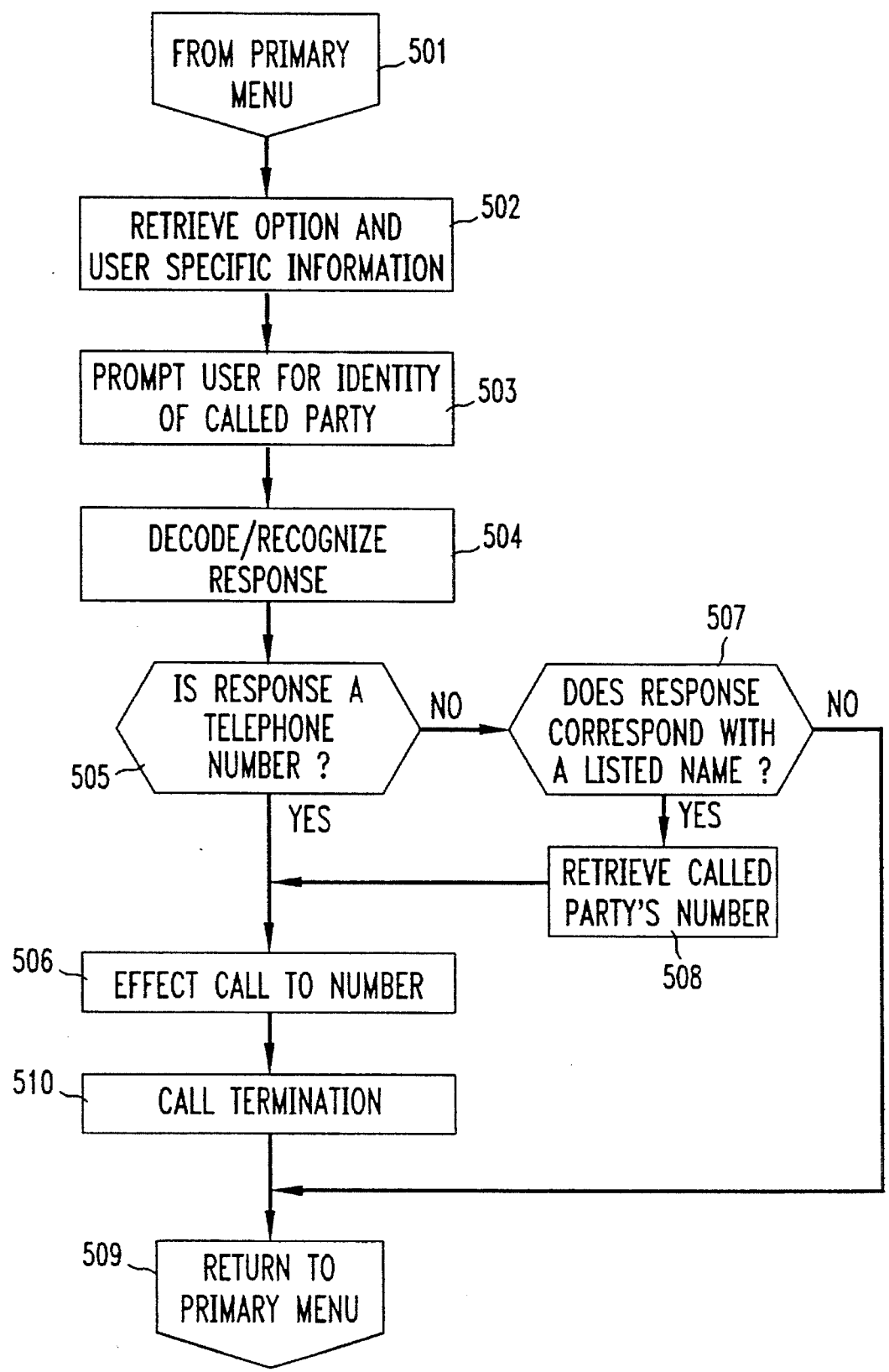
FIG. 5 is a flow diagram of the operations effected within the telecommunication system of FIG. 1 in providing standard telephone services to a user.

FIG. 5 shows a flow diagram depicting the sequence of operations effected within the telecommunication system of FIG. 1 for providing standard telephone services (primary menu option 1). The sequence is entered into via operational connector 501. As represented in operational block 502, option specific profile information is retrieved. The process continues with operational block 503, where a voice prompt, including a request for the identity of the party being called, is provided to the user in the user's language-of-choice. The user's response is recognized and/or decoded in operational block 504. Conditional branch point 505 tests if the user responded to the prompt with a telephone number. If the test result in step 505 is YES, a connection to that number is effected in operational block 506. If the result of step 505 is NO, the operation continues with conditional branch point 507 which tests if the user's response corresponds to a name included in the user's frequently called party listing (in the case of a verbal response this would be the actual name, and in the case of a DTMF response this would be the listing number of a given party). If the result of step 507 is YES, the number associated with that name is retrieved in operational block 508, and a connection is effected in operational block 506. If, however, step 507 yields a NO, the process branches to operational connector 509, which returns the user to the primary menu via operational connector 411 (FIG. 4). Likewise, when an effected call is terminated (operational block 510), the process also branches to operational connector 509, and the user is returned to the primary menu.

Similar voice menu options are provided by the system for the various other service options. Each of these menus will address a user in his or her language of choice, and respond to both DTMF signals and spoken responses received from the user. The teleconferencing option provides a user with a menu for effecting a telephone call involving more than two participants. The messaging services option provides the user with access to a voice mailbox or messaging system where messages may be sent and received (such messaging systems are well-known in the an). The directory assistance option allows the user to contact a live operator, and the language services option connects the user to a live translation service. The user account information/administration option allows a user to check the status of his or her account, and/or modify the profiles which define the specific options made available within the primary and service menus (i.e.; a user is allowed to modify the profiles stored in user database 307).

The above described method provides a technique for providing user-specific telephone services, having a voice interface in the user's language-of-choice, over an area serviced by more than one regional or local telephone service providers. The method allows a user to access a consistent, dependable, customized menu of calling options virtually independent of the local or regional service provider. It will be understood that the particular methods described are only illustrative of the principles of the present invention, and that various modifications could be made by those skilled in the art without departing from the scope and spirit of the present invention, which is limited only by the claims that follow.

One such modification would be accessing the system through a single language-independent number, and providing language-of-choice prompts and responses only after the caller has provided a personal identifier. Another modification might include practicing the invention within a private telecommunication network. The invention could also be modified to operate within an environment where the functionality of both the regional and central processing nodes reside within a single node. A system employing the invention could also connect callers with a "live" help line if their responses to system prompts are not recognized as valid by the ASR/VRU. Yet another modification would employ the invention to provide services in a non-subscriber environment wherein a caller would contact a regional processing node via a language-specific number and gain access to a standard menu of services. The non-subscriber caller could then be charged for the service via a credit card account (the system would request that the caller supply the number of the account before any services are provided. Naturally, any of the above methods could be modified to provide a caller access to any telephone or information service accessible through standard telephone systems.

We claim:

1. A method for providing a consistent means of accessing an array of telephone services, within a communication system comprising:

a plurality of independent switched telephone networks;

a plurality of regional processing nodes, each associated with and linked to at least one of said plurality of switched telephone networks, and adapted to respond to signals received from a caller via said linked switched telephone network; and a central processing node, including a database, said central processing node being external to said plurality of independent telephone networks and responsively linked to each of said plurality of regional processing nodes;

said method comprising the steps of:

receiving, at said regional processing node, a signal originating from a caller, said received signal including information identifying said caller and requesting the provision of one or more telephone services;

transmitting from said regional processing node to said central processing node a representation of said information indicative of said caller's identity and said requested one or more telephone services;

retrieving from said database a listing indicative of telephone services available to the identified caller, and specific information required to execute the telephone services;

transmitting from said regional processing node a representation of said listing and said specific information to the identified caller; and receiving, at said regional processing node, a signal from the identified caller specifying a particular listed telephone service, and in response, effecting the specified service within one or more of said plurality of switched telephone networks.

2. The method of claim 1 wherein said signal requesting the provision of one or more telephone services is representative of a verbal request made by the caller.

3. The method of claim 1 wherein said representation of said listing transmitted to the caller is a verbal listing in the caller's language-of-choice.

4. The method of claim 1 wherein said signal originating from said caller requesting the provision of one or more telephone services is accepted at said regional processing node via a language specific telephone number associated with said regional processing node.

5. The method of claim 1 wherein said plurality of switched telephone networks includes at least one public telephone network.

6. The method of claim 1 wherein said plurality of switched telephone networks includes at least one private telephone network.

* * * * *